Figure 1:
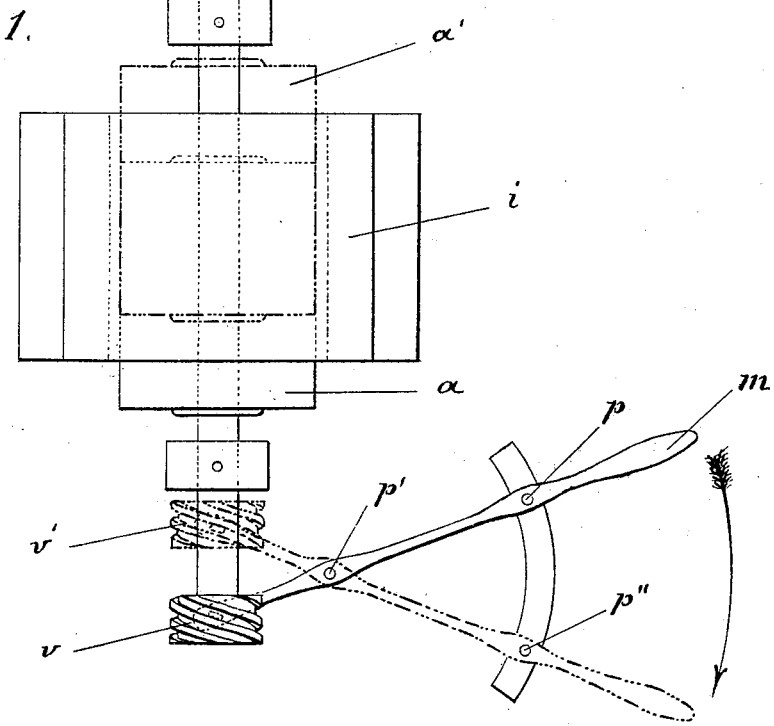

No. 645,247. Patented Mar. 13, 1900.
E. CANTONO.
METHOD OF STARTING ASYNCHRONOUS AND SYNCHRONOUS MONOPHASIC ELECTRIC MOTORS.
(Application filed July 7, 1899.)

(No Model.)

WITNESSES:

INVENTOR
Eugenio Cantono

ATTORNEYS

UNITED STATES PATENT OFFICE.

EUGENIO CANTONO, OF ROME, ITALY.

METHOD OF STARTING ASYNCHRONOUS AND SYNCHRONOUS MONOPHASIC ELECTRIC MOTORS.

SPECIFICATION forming part of Letters Patent No. 645,247, dated March 13, 1900.

Application filed July 7, 1899. Serial No. 723,087. (No model.)

*To all whom it may concern:*

Be it known that I, EUGENIO CANTONO, captain of the body of military engineers in the Italian army, a subject of the King of Italy, residing at Rome, Italy, have invented a new Method of Starting Asynchronous and Synchronous Monophase Electric Motors, (for which I have obtained Letters Patent in the Kingdom of Italy, dated December 19, 1898, No. 50,158,) of which the following is a specification.

My present invention has for its object a new method for starting asynchronous and synchronous monophase motors, which consists in drawing out the armature and utilizing its return movement transformed into a helicoidal movement by means of any suitable device for starting the motor. For this purpose motors are constructed or existing motors are transformed in such a manner that the armature may have a longitudinal play in the axial direction of its shaft. With the aid of any suitable mechanical device the armature when in position of rest is caused to stand more or less extracted from the space reserved to it between the pole extensions of the induction-field. At the time when the current is fed to the induction system the armature will be attracted so as to occupy its position by the induction-field. What I want to perform is to transform the simple translation movement produced by said attraction into a helicoidal movement, so that the moving system will simultaneously advance and rotate and near its final position reach a sufficient angular speed to give it a sufficient driving torque to keep it going. Such transformation can be effected with various devices, one of which is the following: Upon the extension of the shaft carrying the armature I key a screw so that when the armature is drawn out—that is to say, when the motor is at rest—the screw will engage with a nut or any other suitable device, such as a sector fraction of a nut or a pin. The length of the screw and of the nut and their relative position must be so predetermined that at the moment when the armature enters completely in its place between the pole extensions their action will cease—that is to say, they will be completely disengaged from each other. Assuming that the nut or pin be stationary, it will be easily understood that at the time when the current is fed to the motor the armature attracted by the inductor in order to move along its axis will have to rotate in the direction determined by the screw, and by proportioning its thread, which may also be decreasing, if necessary, it will be possible to obtain that in the moment when the screw leaves the nut—that is to say, at the time when the armature is completely in place with respect to the induction-field—the armature will have reached such an angular speed to provide, as above stated, a sufficient driving torque to keep going. It will also be seen that with a single screw it is possible to reverse the movement, it being sufficient to cause the armature to go out from the opposite side with respect to the inductor to that above referred to. In this case when starting, the screw engaging with the nut as usual, the armature, in order to advance according to the direction of the axis of its shaft, will have to rotate in the opposite direction to the former one.

Figure 2:
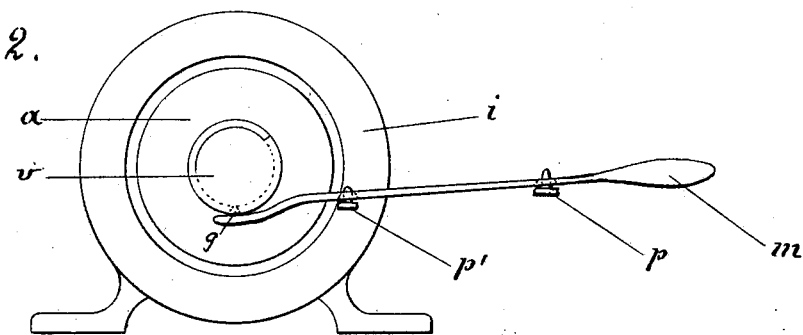

In the annexed drawings, Figure 1 is a diagrammatical plan view of the iron parts of a monophasic motor. Fig. 2 is a diagrammatical side view of same.

$i$ is the stationary part, which is generally the inductor.

$a$ is the movable armature, which is shown in black lines in its drawn-out position, so as to start the motor through a rotatory movement of the armature.

$v$ is the screw keyed upon the shaft.

$m$ is the handle of the operating-lever, provided at its end with a pin $g$, acting as a nut.

$p''$ is a fixed pin upon which is pivoted in a horizontal plan the lever $m$, and $p$ is the rest-pin corresponding to the starting with a rotatory motion opposite to that of the arrow.

The dotted lines show the movable armature in position for starting the motor in the opposite direction to that above mentioned—that is to say, in the direction of the arrow. $a'$ shows the armature in its new position. $v'$ is the screw in its new position, and $p''$ the rest-pin for the handle in its new position.

It is obvious that my said invention is not limited to the construction and arrangement of parts above described and illustrated, but that many other different arrangements and devices may be used for accomplishing same without departing from the gist of my invention, and

What I claim as new, and desire to secure by Letters Patent, is—

A new method of starting asynchronous and synchronous monophase electric motors, consisting in drawing out the armature, while in its position of rest, from the space which it should occupy in the normal movement, and utilizing the return movement of the armature, when attracted back, in the moment of feeding the starting-current, for producing rotation by transforming this simple movement of translation into a helicoidal movement and thus causing a very energetic rotary movement of the armature, in order to produce the necessary driving torque to keep it going, substantially as set forth.

In witness whereof I have hereunto set my signature in the presence of two witnesses.

EUGENIO CANTONO.

Witnesses:
  G. B. ZANARDO,
  ONISTODEMO ROZZI.